United States Patent [19]

Ohno et al.

[11] Patent Number: 4,928,894
[45] Date of Patent: May 29, 1990

[54] COIL WINDING MACHINE AND COIL WINDING METHOD USING THE SAME

[75] Inventors: Aritaka Ohno, Hachiouji; Kanji Shitara, Tokyo; Masakazu Harashima, Akikawa, all of Japan

[73] Assignee: Japan Aviation Electronics Industry Limited, Tokyo, Japan

[21] Appl. No.: 390,787

[22] Filed: Aug. 8, 1989

[30] Foreign Application Priority Data

Aug. 26, 1988 [JP] Japan .................. 63-212717

[51] Int. Cl.$^5$ .................. H01F 11/04; B21F 45/00; G02B 6/00
[52] U.S. Cl. .................. 242/7.09; 242/7.02; 242/7.05 B; 350/96.1
[58] Field of Search .................. 242/7.01, 7.02, 7.06, 242/7.07, 7.14, 7.15, 47, 7.05 B, 7.05 C, 7.09; 350/96.1

[56] References Cited

U.S. PATENT DOCUMENTS 4,520,965  6/1985  Kimura et al. .................. 242/7.05 B

FOREIGN PATENT DOCUMENTS 1073542  9/1954  France .................. 242/7.05 B
2173471  10/1986  United Kingdom .................. 242/7.02

*Primary Examiner*—Stuart S. Levy
*Assistant Examiner*—William G. Battista, Jr.
*Attorney, Agent, or Firm*—Pollock, Vande Sande and Priddy

[57] ABSTRACT

An optical fiber coil winding machine in which first and second spindles are axially aligned but spaced apart and a take-up bobbin for winding thereon an optical fiber is held between opposed ends of the first and second spindles. First and second indexes are rotatably mounted about the first and second spindles, respectively, and first and second spinners are mounted about the first and second indexes in a manner to be movable in their axial direction. First and second supply bobbins having wound thereon an optical fiber are rotatably mounted on the first and second spinners, respectively.

3 Claims, 4 Drawing Sheets

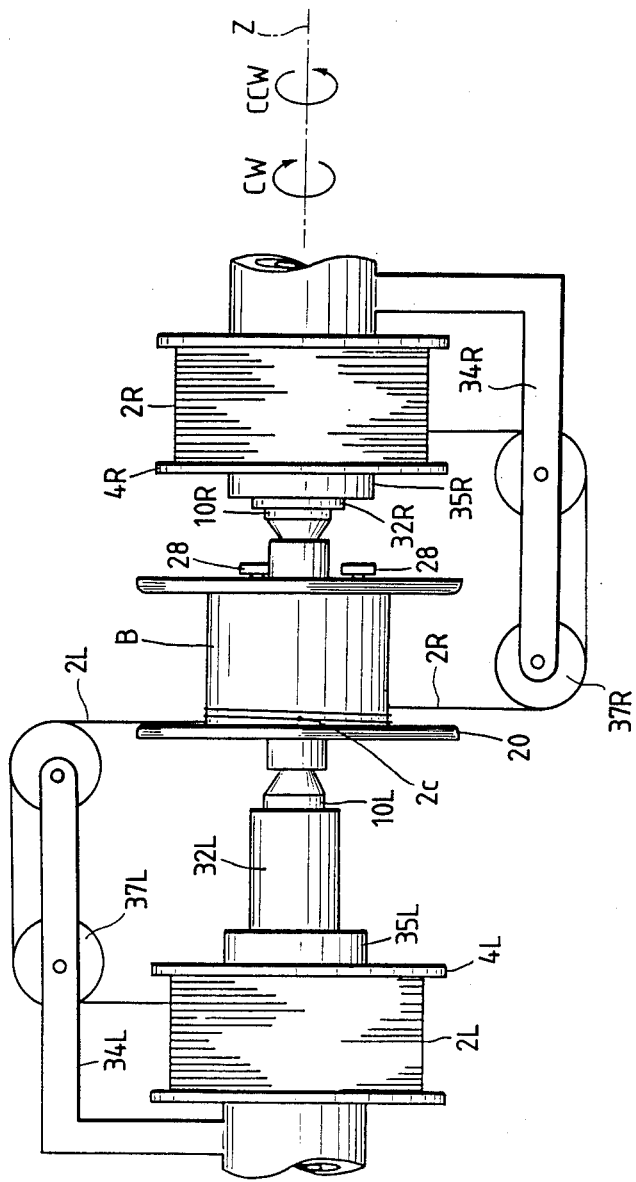

COIL WINDING MACHINE AND COIL WINDING METHOD USING THE SAME

BACKGROUND OF THE INVENTION

The present invention relates to a coil winding machine for winding a wire or the like onto a take-up bobbin to fabricate a coil. More particularly, the invention pertains to a coil winding machine for fabricating an optical fiber coil and a coil winding method using the winding machine.

A sensing coil of a fiber optic gyro is usually formed by a multilayer coil so as to provide for enhanced sensitivity. Conventionally, this mutilayer coil has a solenoid-like configuration in which an optical fiber is wound in the opposite direction for each layer as shown in FIG. 1, in which an optical fiber 2 from the one end 2r to the other 2l thereof is wound onto a take-up bobbin B, with a first layer wound from one end to the other of the bobbin B in its axial direction Z as indicated by the arrow 3a, a second layer in the opposite direction as indicated by the arrow 3b. ...

However, as set forth in N.J. Frigo, SPIE, Vol. 412, pp268-271, 1983, for example, when the senseing coil formed by such a solenoid-like multilayer coil is subjected to a temperature change, its thermometric conductivity variations produce an error in the output of the fiber optic gyro which is expressed by $$\Delta\theta\epsilon = \frac{nN\pi\Delta n_0}{6} (1 + 1/m) \quad (1)$$

where n is the refractive index of the optical fiber, N the number of turns, $\Delta n_0$ the product of the temperature coefficient of the refractive index and the temperature changing ratio, and m the number of layers of the coils.

With a view to minimizing the output error of the fiber optic gyro, there has been proposed a sensing coil of a structure in which the one half and the other half of the optical fiber—split in the middle—are alternately wound onto a single take-up bobbin in such a manner that their induvidual parts symmetrical with respect to the middle or intermediate point of the fiber are disposed spatially close or adjacent to each other and are subjected to similar temperature changes, thereby reducing the contributing factor to the output error.

A variety of coil structures have been proposed to implement such a coil. A typical one of them is such a multilayer coil as depicted in FIG. 2, in which two substantially equal halves of the optical fiber, i.e. the one half portion 2R of the optical fiber 2 from its intermediate point 2c to the one end 2r and the other half portion 2L from the intermediate point 2c to the other end 2l are alternately wound around the take-up bobbin B repeatedly in units of four layers, with the intermediate point 2c held at the innermost position on the bobbin B. A first layer of the coil is formed by winding a part of the one half portion 2R, which is the closest to the intermediate point 2c, around the take-up bobbin B from its one end to the other in its axial direction Z as indicated by the arrow 3c; a second layer is formed by winding a part of the other half portion 2L, which is the closest to the intermediate point 2c, around the bobbin B in the same direction as in the case of the frist layer, as indicated by the arrow 3d; a third layer is formed by winding another part of the other half portion 2L, which is the second closest to the intermediate point 2c, around the bobbin B from the other end to the one end in its axial direction Z as indicated by the arrow 3e; a fourth layer is formed by winding another part of the one half portion 2R, which is the second closest to the intermediate point 2c, around the bobbin B in the same direction as in the case of the third layer, as indicated by the arrow 3f; a fifth layer is formed by winding another part of the one half portion 2R, which is the third closest to the intermediate point 2c, around the bobbin B from the one end to the other in its axial direction Z as indicated by the arrow 3g; and the subsequent layers are also formed in the same manner as described above.

With the use of such a multilayer coil, the output error of the fiber optic gyro is marked reduced as compared with the output error suffered in the case of employing th solenoid-like multi-layer coil shown in FIG. 1, as expressed by $$\Delta\theta\epsilon = \frac{nN\pi\Delta n_0}{6} \frac{1}{4m(m-1)} \quad (2)$$

Incidentally, the conventional winding machine is designed exclusively for fabricating the solenoid-like multilayer as depicted in FIG. 1, and hence it cannot be utilized for producing the multilayer coil such as shown in FIG. 2.

According to a conventional method for the manufacture of the multilayer coil depicted in FIG. 2, the one half 2R of the optical fiber 2 from one end 2r to the middle or intermediate point 2c thereof and the other half 2L from the other end 2l to the middle point 2c are wound onto a pair of supply bobbin 4R and 4L through use of a winding machine as shown in FIG. 3, then the middle point 2c of the optical fiber 2 is disposed at the innermost position in the take-up bobbin B, and as shown in FIG. 4, the one half and the other half portions 2R and 2L of the optical fiber 2 are manually wound onto the take-up bobbin B from the supply bobbins 4R and 4L in the sequence and manner described previously with respect to FIG. 2.

However, this prior art method involves handwork as mentioned above, and hence is very time- and labor-consuming. In addition, since the manual winding of the optical fiber 2 onto the take-up bobbin B is subject to each worker's individual difference in skill and concentration on the work, it is difficult to obtain multilayer coils in uniform quality.

SUMMARY OF THE INVENTION

It is therefore an object of the present invention to provide an optical fiber coil winding machine and method by which one or more optical fibers prestored on a plurality of supply bobbins are wound onto a single take-up bobbin in a desired sequence and manner so that multilayer coils of a desired structure can be obtained in uniform quality without involving large amounts of time and labor.

The optical fiber coil winding machine of the present invention includes a pair of spindles holding therebetween a take-up bobbin and a plurality of rotary mechanisms which individually support a plurality of supply bobbins each having prestored thereon a part of or whole optical fiber.

The rotary mechanisms can be mounted on the spindles concentrically therewith.

The coil winding operation by the machine of the present invention starts with installing the take-up bobbin between the spindles and then mounting the supply bobbins on the corresponding rotary machanisms, followed by driving the spindles and the rotary mechanisms in accordance with a preset procedure, whereby one or more optical fibers stored on the supply bobbins can be wound onto the single take-up bobbin in a predetermined sequence and manner.

BRIEF DESCRIPTION OF THE DRAWINGS

FIG. 6 is a front view illustration its principal part.

DESCRIPTION OF THE PERFERRED EMBODIMENT

Figure 5:
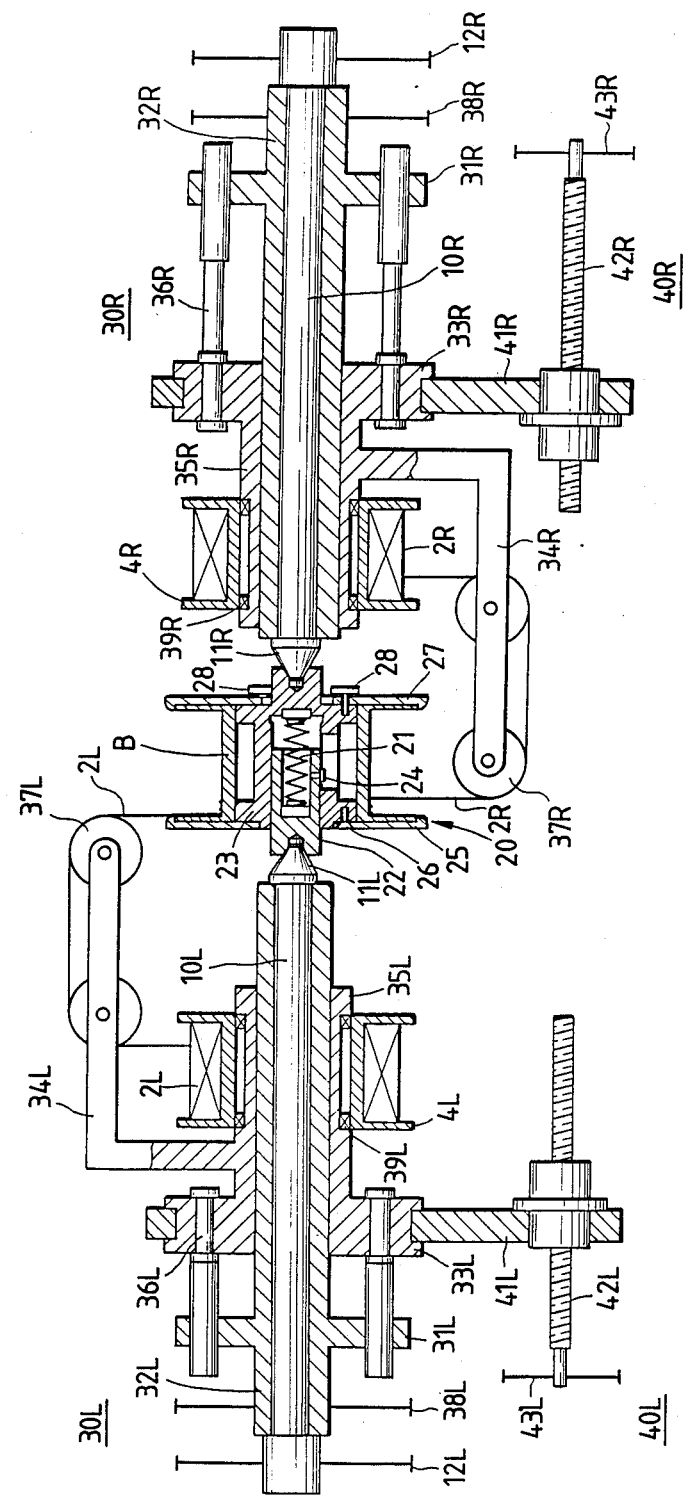
FIG. 5 is a sectional view illustrating an embodiment of the coil winding machine of the present invention.

FIGS. 5 and 6 illustrate an embodiment of the coil winding machine of the present invention, in which a pair of rotary mechanisms 30L and 30R, which individually support a pair of supply bobbins 4L and 4R, are mounted on a pair of spindles 10L and 10R concentrically therewith, the spindles being axially aligned and holding therebetween a take-up bobbin B.

As shown in FIGS. 5 and 6, a bobbin adapter 20 loaded with the take-up bobbin B is held between the pair of axially aligned spindles 10L and 10R with their inner end portions 11L and 11R spaced a predetermined distance apart.

The bobbin adapter 20 comprises an inner tublar center 22 having fixed thereto one end of a spring 21 is housed in an outer tubular center 23; the spring 21 is fixed at the other end to the outer tubular center 23; a screw 24 is secured to the inner tubular center 22 for preventing it from coming off; a flange 25 is attached to one end of the outer tubular center 23 by means of screw 26; the take-up bobbiin B is mounted about the outer tubular center 23; and a flange 27 is attached to the other end of the outer tubular center 23 by screw 28. The bobbin adapter 20 is inserted between the inner end portions 11L and 11R of the spindles 10L and 10R, with the inner tubu- lar center 22 pressed into the outer tubular center 23 against the force of the spring 21, and then the force applied to the inner tubular center 22 is removed. In consequence, the tubular center 22 partly projects out of the outer tubular center as a result of the force of the spring 21 and the bobbin adapter 20 is resiliently held by the spindles 10L and 10R between their inner end portions 11L and 11R applying constant pressures to the adapter 20.

Pulleys 12L and 12R are installed on the spindles 10L and 10R at the other ends thereof, respectively. By driving the pulleys 12L and 12R at the same speed in the same direction, the spindles 10L and 10R and the bobbin adapter 20 loaded with the take-up bobbin B are rotated as a single unit.

A rotary mechanism 30L on the spindle 10L, which carries the one supply bobbin 4L, includes: an index 32L having a flange 31L and mounted on the spindle 10L; a spinner 35L having a flange 33L and an arm 34L and mounted on the index 32L; a flange 33L slidably coupled with the flange 31L by a guide 36L; a guide pulley 37L attached to the tip of the arm 34L; and a pulley 38L installed on the index 32L at its one end near the other end of the spindle 10L. The supply bobbin 4L is put on the spinner 35L from the one end portion 11L of the spindle 10L prior to the loading of the bobbin adapter 20 between the spindles 10L and 10R. By driving the pulley 38L the index 32L and the spinner 35L are rotated as a single unit. In that portion of the spinner 35L where the supply bobbin 4L is mounted there are provided bearings 39L which permit the bobbin 4L to freely rotate relative to the index 32L and the spinner 35L.

The spinner 35L is coupled to the index 32L through the guide 36L and the supply bobbin 4L is mounted on the spinner 35L, so that the spinner 35L and the bobbin 4L are movable relative to the index 32L and the spindle 10L, within a predetermined range in their axial directions, respectively.

A translation mechanism 40L is provided to translate the spinner 35L and the supply bobbin 4L, without impeding their rotation, relative to the index 32L and the spindle 10L in their axial directions, respectively. The translation mechanism 40L comprises a traverser 41L secured to the flange 33L of the spinner 35L, a feed screw 42L coupled to the traverser 41L, and a pulley 43L installed on the feed screw 42L. With the rotation of the pulley 43L in one direction, the traverser 4L, the spinner 35L and the supply bobbin 4L move as a single unit toward the take-up bobbin B, whereas when the pulley 43L is driven in the other direction, the traverser 4L, the spinner 35L and the bobbin 4L move away from the bobbin B. For the convenience of illustration, let it be assumed that the pulleys 12L, 12R, 38L, 38R, 43L and 43R include drive means therefor.

A rotary mechanism 30R on the spindle 10R, which supports the other supply bobbin 4R, is symmetrical in configuration with the rotary mechanism 30L on the spindle 10L. A translation mechanism 40R for the supply bobbin 4R is also symmetrical in configuration with the translation mechanism 40L for the supply bobbin 4L. Accordingly, the parts of the rotary mechanism 30R and the translation mechanism 40R which correspond to the respective parts of the rotary and translation mechanisms 30L and 40L are identified by the same reference numerals with the letter R in place of the letter L in each case.

Figure 1:
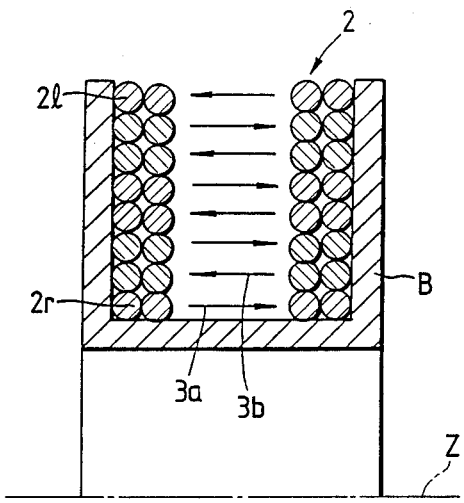
FIG. 1 is a sectional view showing, by way of example, a conventional fiber coil.
Figure 2:
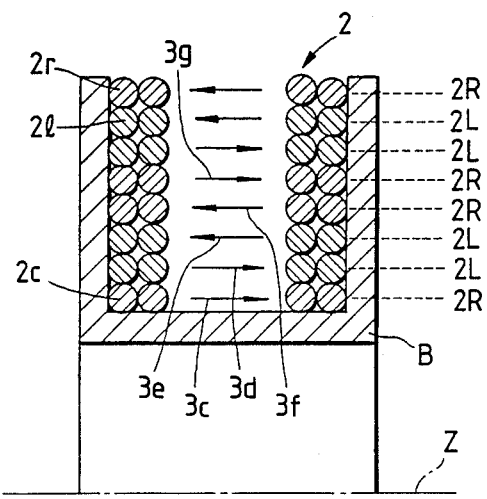
FIG. 2 is sectional view showing a multilayer coil of the type intended to be fabricated by the coil winding machane of the present invention.
Figure 3:
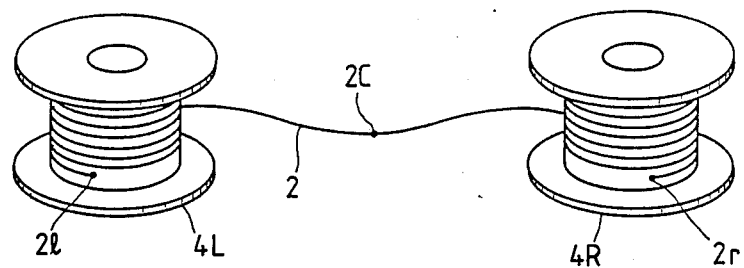
FIG. 3 is a diagram showing two substantially equal halves of an optical fibers wound onto a pair of supply bobbins.
Figure 4:
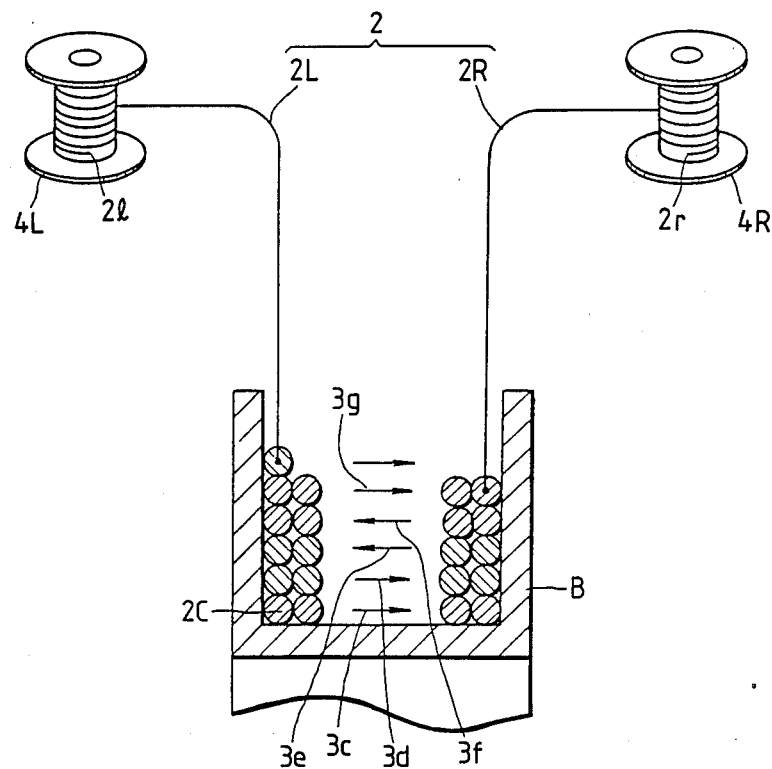
FIG. 4 is a diagram showing a conventional method for manufacturing the multilayer coil shown in FIG. 2.

The illustrated example is intended for fabricating a multilayer coil having the structure depicted in FIG. 2. In this case, the one half portion of the optical fiber 2 from its one end 2r to the vicinity of the interemedicate portion 2c and the other half portion from the other end 2l to the vicinity of the intermediate point 2c are previously wound in a solenoid form on the supply bobbins 4L and 4R, respectively, by use of a conventional winding machine as shown in FIG. 3. Then the intermediate portion of the optical fiber 2 in the vicinity of its intermediate point 2c is wound several turns around the take-up bobbin B mounted on the bobbin adapter 20 (see FIG. 6). Thereafter the supply bobbin 4L is put on the spinner 35L and the portion of the optical fiber 2 between the supply bobbin 4L and the take-up bobbin B is drawn across the guide pulley 37L. At the same time, the supply bobbin 4R is put on the spinner 35R and the portion of the optical fiber 2 between the supply bobbin 4R and the take-up bobbin B is drawn across the guide pulley 37R. Finally, the bobbin adapter 20 loaded with the take-up bobbin B is installed between the spindles 10L and 10R. At this time, the portion of the optical fiber 2 in the neighborhood of its intermediate portion 2c is wound around the take-up bobbin B at one end thereof near the supply bobbin 4L, the spinner 35L and the supply bobbin 4L are placed at their outermost position or farthest from the take-up bobbin B, and the spinner 35R and the supply bobbin 4R are placed at their innermost position or closest to the take-up bobbin B.

The pulleys 12L, 12R, 38L, 38R and 43L, 43R are driven by a drive means (not shown) following the steps described below for driving the spindles 10L, 10R, the indexes 32L, 32R, and the feed screws 42L, 42R to rotate the take-up bobbin B and the spinner 35L, 35R so as to cause the optical fiber 2 to be wound onto the take-up bobbin B from the supply bobbin 4L and 4R.

Step 1: The index 32R and the spinner 35R are not rotated but the spindles 10L and 10R, the take-up bobbin B, the index 32L, and the spinner 35L are rotated at the same speed in the counterclockwise direction as viewed from the right-hand side in FIGS. 5 and 6, as indicated by the arrow CCW in FIG. 6.

Since the spinner 35R remains stationary during the counterclockwise rotation of the take-up bobbin B and the spinner 35L at the same speed, the spinner 35R rotates relative to the take-up bobbin B in the clockwise direction as viewed from the right-hand side in FIGS. 5 and 6, as indicated by the arrow CW in FIG. 6, while the spinner 35L is at a standstill relative to the take-up bobbin B. Consequently, the portion 2R of the optical fiber 2 in the vicinity of the intermediate point 2c is wound onto the take-up bobbin B from the supply bobbin 4R. At this time, the supply bobbin 4R rotates relative to the spinner 35R in a manner to let out the portion 2R of the optical fiber 2 to the take-up bobbin B, whereas the supply bobbin 4L rotates together with the spinner 35L while remaining at a standstill relative to the take-up bobbin B.

At the same time, the feed screw 42R is rotated in a direction which moves the spinner 35R and the supply bobbin 4R away from the take-up bobbin B at a speed at which they are fed by a distance corresponding to the diameter of the optical fiber 2 for each rotation of the take-up bobbin B.

By such feeding of the spinner 35R and the supply bobbin 4R, the portion 2R of the optical fiber 2 is wound side by side onto the take-up bobbin B in its axial direction Z. While the spinner 35R and the supply bobbin 4R are fed to their outermost position farthest from the take-up bobbin B, that part of the portion 2R of the optical fiber 2 which is the closest to the intermediate point 2c is wound, as the first layer, onto the take-up bobbin B from its one end to the other in its axial direction Z as indicated by the arrow 3c in FIG. 2.

Step 2: The index 32L and the spinner 35L are not rotated but the spindle 10L and 10R, the take-up bobbin B, the index 32R and the spinner 35R are driven at the same speed in the clockwise direction as viewed from the right-hand side in FIGS. 5 and 6.

Since the spinner 35L remains stationary during the clockwise rotation of the take-up bobbin B and the spinner 35R at the same speed, the spinner 35L rotates relative to the take-up bobbin B in the counterclockwise direction as viewed from the right-hand side in FIGS. 5 and 6, while the spinner 35R is at a standstill relative to the take-up bobbin B. Consequently, the portion 2L of the optical fiber 2 in the neighborhood of the intermediate point 2c is wound onto the take-up bobbin B from the supply bobbin 4L. At this time, the supply bobbin 4L rotates relative to the spinner 35L in a manner to let out the portion 2L of the optical fiber 2 to the take-up bobbin B, whereas the supply bobbin 4R rotates together with the spinner 35R while remaining at a standstill relative to the take-up bobbin B.

At the same time, the feed screw 42L is rotated in a direction which moves the spinner 35L and the supply bobbin 4L toward the take-up bobbin B at a speed at which they are fed by a distance corresponding to the diameter of the optical fiber 2 for each rotation of the take-up bobbin B.

By such feeding of the spinner 35L and the supply bobbin 4L, the portion 2L of the optical fiber 2 is wound side by side onto the take-up bobbin B in its axial direction Z. While the spinner 35R and the supply bobbin 4L are fed to their innermost position closest to the take-up bobbin B, that part of the portion 2L of the optical fiber 2 which is the closest to the intermediate point 2c is wound, as the second layer, onto the take-up bobbin B from its one end to the other in its axial direction Z as indicated by the arrow 3d in FIG. 2.

Step 3: As in Step 2, the index 32L and the spinner 35L are not rotated but the spindles 10L and 10R, the take-up bobbin B, the index 32R and the spinner 35R are rotated at the same speed in the clockwise direction as viewed from the right-hand side in FIGS. 5 and 6. Consequently, the portion 2L of the optical fiber 2 is wound onto the take-up bobbin B from the supply bobbin 4L.

At the same time, the feed screw 42L is rotated in the direction opposite from that in Step 2, so that the spinner 35L and the supply bobbin 4L are moved away from the take-up bobbin B at the afore-mentioned speed.

In consequence, while the spinner 35L and the supply bobbin B move to the outermost position farthest from the take-up bobbin B, that part of the portion 2L of th optical fiber 2 which is the second closest to the intermediate point 2c is wound, as the third layer side by side onto the take-up bobbin B from the other end to the one end in its axial direction Z as indicated by the arrow 3e in FIG. 2.

Step 4: As in Step 1, the index 32R and the spinner 35R are not rotated but the spindles 10L and 10R, the take-up bobbin B, the index 32L and the spinnerr 35L are rotated at the same speed in the counterclockwise direction as viewed from the right-hand side in FIGS. 5 and 6. Consequently, the portion 2R of the optical fiber 2 is wound onto the take-up bobbin B from the supply bobbin 4R.

At the same time, the feed screw 42R is rotated in the direction opposite from that in Step 1, so that the spinner 35R and the supply bobbin 4R are moved toward the take-up bobbin B at the afore-mentioned speed.

As a result of this, while the spinner 35R and the supply bobbin 4R move to their innermost position closest to the take-up bobbin B, that part of the portion 2R of the optical fiber 2 which is the second closest to the intemediate point 2c is wound side by side, as the fourth layer, onto the take-up bobbin B from the other end to the one end in its axial direction Z as indicated by the arrow 3f in FIG. 2.

In the subsequent steps, Steps 1 to 4 described above are repeated. Thus a multilayer coil of the structure shown in FIG. 2 is obtained. After winding or the multilayer coil, the bobbin adapted 20 is dismounted from between the spindles 10L and 10R, the flange 27 is detached from the tubluar center 23, and then the take-up bobbin B carrying the multilayer coil is removed from the tubular center 23.

The embodiment depicted in FIGS. 5 and 6 has been described in connecion with the case where the spinner 35R (or 35L) on the part from which the optical fiber 2 is currently wound onto the take-up bobbin B is not rotated but instead the spinner 35L (or 35R) on the part from which the optical fiber 2 is not currently wound onto the take-up bobbin B and the take-up bobbin B are driven at the same speed in the same direction. According to this winding method, the guide pulley 37R (or 37L) which currently guides the optical fiber 2 being wound onto the take-up bobbin B is held at a standstill. Letting the axis of rotation of the bobbin B be represented by Z and mutually orthogonal axes perpendicular to the Z axis be represented by X and Y, respectively, the spatial coordinate position (x, y, z,) where the optical fiber 2 being wound onto the take-up bobbin B is tangent thereto shifts in the Z-axis direction but remains substantially stationary in the X- and the Y-axis direction. This facilitates the operator's monitoring of the state of the optical fiber 2 being wound onto the take-up bobbin B.

When there is no need of monitoring the state of the optical fiber 2 being wound onto the take-up bobbin B as in the case where the coil winding machine is so designed as to permit automatic control of the number of turns of the optical fiber 2, only the spindle 35R (or 35L) on the part from which the optical fiber 2 is currently wound onto the take-up bobbin B needs to be driven, with the bobbin B held stationary at all times. In such a case, the pulleys 12L and 12R and the drive means (not shown) thererfor can be left out. Alternatively, it is possible to employ an arrangement in which when either one of the left-and right-hand portions 2L and 2R of the optical fiber 2 is wound onto the take-up bobbin B, the bobbin B is rotated, whereas when the other is wound onto the take-up bobbin B, the bobbin B is held stationary and the corresponding spinner 35L or 35R is driven.

In the case where the rotary mechanisms 30L and 30R, which individually carry the supply bobbin 4L and 4R, are mounted on the spindles 10L and 10R concentrically therewith as in the embodiment shown in FIGS. 5 and 6, the coil winding machine can be formed simple and small.

Rotary shafts of the pair of rotary mechanisms may also be provided in parallel or at right angles to the spindles carrying the take-up bobbin.

It is also possible to adopt an arrangement in which one optical fiber is wound in the solenoid form onto each of a pair of supply bobbins in advance, the two fibers are wound onto the take-up bobbin in the same manner as that used for winding the portions 2L and 2R of the optical fiber 2 in the above-described embodiment, and then the optical fibers thus wound onto the take-up bobbin are connected together, obtaining a multilayer coil of the structure depicted in FIG. 2.

The present invention is applicable as well to the case where a part of an optical fiber or one optical fiber is prestored on each of three or more supply bobbins, the respective parts or the respective optical fibers are wound onto a take-up bobbin in a predetermined sequence and manner, and they are connected as required, thereby obtaining a multilayer coil of predetermined structure.

As described above, according to the present invention, spindles for holding therebetween a take-up bobbin and a plurality of rotary mechanisms for individually carrying a plurality of supply bobbins, each having prestored thereon a part of an optical fiber or one optical fiber, are provided, by which the respective parts of the optical fiber or the respective optical fibers can be wound onto the take-up bobbin a predetermined sequence and manner, providing a multilayer coil of a desired structure in uniform quality without involving large amounts of time and labor.

Furthermore, the entire structure of the coil winding machine can be made simple and small in the case where the rotary mechanisms each carrying one of the supply bobbins are mounted on the spindles concentrically therewith.

It will be apparent that many modifications and variations may be effected without departing from the scope of the novel concepts of the present invention.

What is claimed is:

1. A coil winding machine comprising:
   first and second spindles axially aligned but spaced apart from each other, for holding therebetween a take-up bobbin;
   frist and second spinner means rotatable mounted about said first and second spindles, respectively, for rotatably holding first and second supply bobbins having prestored thereon an optical fiber;
   first and second driving means for rotating said first and second spinner means relative to said first and second spindles, respectively;
   first and second guide means mounted on said first and second spinner means, respectively, and spaced from one another in directions transverse to the axis of said take-up bobbin, for guiding optical fiber supplied from said first and second supply bobbins onto said take-up bobbin in directions parallel to the axis of said take-up bobbin;
   first and second moving means for moving said first and second spinner means axially thereof as said optical fiber is wound onto said take-up bobbin;
   said first and second moving means including first and second index means rotatably mounted on said first and second spindles and fixed axially thereof for slidably holding said first and second spinner means, respectively, and first and second axial driving means engaged with said first and second spinner means axially thereof for sliding said first and second spinner means axially thereof during the rotation of said first and second index means;
   said first and second driving means including first and second index driving means for driving said first and second index means independently of each other.

2. The coil winding machine of claim 1 wherein said first and second driving means further include spindle driving means for driving said first and second spindles, respectively.

3. A coil winding method by a coil winding machine which includes: frist and second spindles axially aligned for holding therebetween a take-up bobbin; first and second indexes rotatably mounted on said first and second spindles and fixes axially thereof; and first and second spinners mounted on said first and second indexes slidably axially thereof and having rotatably loaded thereon first and second supply bobbins, respectively, said method comprising:

Step 1: wherein said first spinner is driven to move away from said second spinner, with said first index held stationary, and at the same time, said first and second spindles and said second index are rotated clockwise at the same speed by a first predetermined number of times so that said take-up bobbin is rotated said first predetermined number of times while being held stationary relative to said second supply bobbin, whereby said optical fiber supplied from said first supply bobbin is wound onto said take-up bobbin said first predetermined number of times;

Step 2: wherein said second spinner is driven to approach said first spinner, with said second index held stationary, and at the same time said first and second spindles and said first index are rotated counterclockwise at the same speed by a second predetermined number of times so that said take-up bobbin is rotated said second predetermined number of times while being held stationary relative to said first supply bobbin, whereby said optical fiber supplied from said second supply bobbin is wound onto said take-up bobbin said second predetermined number of times;

Step 3: wherein said second spinner is driven to move away from said first spinner, with said second index held stationary, and at the same time, said first and second spindles and second first index are rotated counterclockwise at the same speed by a third predetermined number of times so that said take-up bobbin is rotated said third predetermined number of times while being held stationary relative to said first supply bobbin, whereby said optical fiber supplied from said second supply bobbin is wound onto said take-up bobbin said third predetermined number of times;

Step 4: wherein said second spinner is driven to approach said first spinner, with said first index held stationary, and at the same time, said first and second spindles and said first index rotated clockwise at the same speed by a fourth predetermined number of times so that said take-up bobbin is rotated said fourth predetermined number of times while being held stationary relative to said second supply bobbin, whereby said optical fiber supplied from said first supply bobbin is wound onto said take-up bobbin said fourth predetermined number of times; and Step 5: wherein said Steps 1 through 4 are repeated a plurality of times.

* * * * *